Oct. 16, 1962 W. P. SUMMERS 3,058,661
GROUND RANGE DETERMINING APPARATUS SOLVING
FOR ONE SIDE OF A RIGHT TRIANGLE
Filed Dec. 20, 1957 2 Sheets-Sheet 1

*INVENTOR.*
WILLARD P. SUMMERS

BY

Ralph R Barnard
ATTORNEY

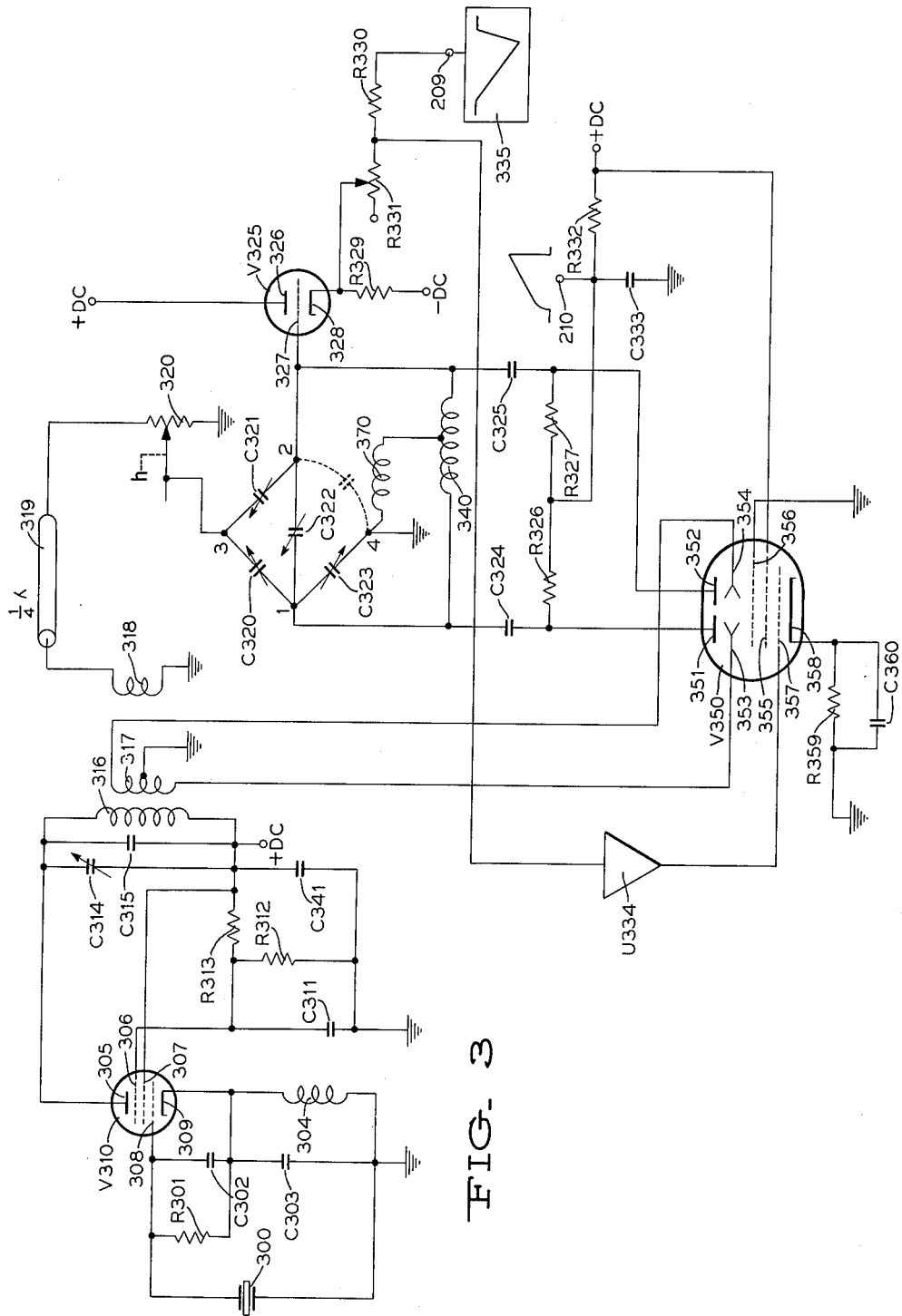

3,058,661
GROUND RANGE DETERMINING APPARATUS SOLVING FOR ONE SIDE OF A RIGHT TRIANGLE
Willard P. Summers, Vestal, N.Y., assignor to International Business Machines Corporation, New York, N.Y., a corporation of New York
Filed Dec. 20, 1957, Ser. No. 704,060
8 Claims. (Cl. 235—191)

This invention relates to means for electronically solving a right triangle and more particularly to new and improved means for accurately deriving a solution commensurate with one side of a right triangle when the magnitude of both the hypotenuse and the other side are known.

It is an established mathematical principle that the relationship between the magnitudes of the base and the hypotenuse and altitude of a right triangle is hyperbolic in nature. One area where this mathematical principle is important is in the design of the presentation indicators usable with airborne radars. This is true by reason of the fact that in airborne radar systems used for both air navigation and bombing it is often essential that the relative ground position of targets or reference points be presented without scale distortions. As is well known, a common type of radar employs transmitted pulses of electromagnetic energy which are transmitted to and reradiated from targets and reference points at the speed of light in a manner so that the time elapse between the transmission and the receipt of the energy pulses provides information commensurate with the slant range to the target or reference point. In addition, the transmitting antenna may be rotated such that successive rangings are taken at different bearings.

Whenever it is desired that the radar indicator provide a composite presentation of these successive rangings with a map-like appearance, it is often also desirable that the distances between objects (targets and/or reference points) be a scalar representation of the corresponding distances separating these objects on the earth's surface. Inasmuch as the radar equipment is airborne and the distance traveled by the transmitted pulses may vary in accordance with the altitude of the aircraft mounting the radar, it is apparent that the ranges measured by the radar are those between the aircraft and the target or reference point (slant range) and not the ground range between the projection of the aircraft on the earth and the target or reference point. As a result, when this slant range information is utilized as the input to the radar presentation, targets at short ground ranges are shown too close together, while targets at increasing distant ground ranges tend to appear to approach an undistorted display. In order that a radar presentation be provided where the corresponding distances between objects are not distorted, it is necessary that the slant range radar information be displayed in appropriate ground range co-ordinates. As indicated above, the relationship between any particular slant range and its corresponding ground range quantity is hyperbolic in nature.

One type of radar presentation is known as a plan position indicator (PPI) wherein an electron beam emanating within a cathode ray tube is successively swept radially outward from a predetermined point on the cathode ray tube screen while the direction of each successive beam sweep is being rotated through a complete circle or scanned back and forth through a sector thereof. Another type of radar presentation is provided by the movement of an electron beam across the screen of a cathode ray tube by co-ordinated X and Y sweeps where the Y sweep traversal of the electron beam across the screen is co-ordinated with the time required for the transmitted electromagnetic energy pulses to travel to and from the target or reference point. In either of these types of radar presentation the cathode ray beam is intensified on the receipt of the reradiated pulses from the target or reference point to cause the appearance of a luminous spot in a position on the face of the screen corresponding to the range being presented.

According to the prior art, in order that the map-like presentation be provided, the instantaneous voltages commensurate with slant range sweep have been converted to corresponding instantaneous voltages commensurate with ground range sweep prior to their presentation on radar indicators of the type described above by synthesizing an electronic transfer function which approximately corresponds to the hyperbolic relation between them.

More specifically, one technique of the prior art has been to utilize an R-C network to reproduce this hyperbolic relationship from the slant range voltage sweep. For example, several R-C parameter combinations may be connected with saw-tooth voltage source in a manner so that the exponential charging curves of each, provide an output waveform from the network having a voltage versus time characteristic which is approximately hyperbolic in shape.

Another technique of the prior art has been to compute the ground range as a dependent variable from an independent variable commensurate with slant range by mechanizing the following equation:

$$R_g = \sqrt{R_s^2 - h^2} \qquad (1)$$

where $R_g$=instantaneous ground range being searched by the electromagnetic energy pulses
$R_s$=instantaneous slant range being searched by the electromagnetic energy pulses, and
$h$=instantaneous altitude of the aircraft carrying the airborne radar.

However, a direct mechanization of Equation 1 which would provide an accurate solution utilizing prior art techniques is difficult by reason of the fact that, even though quantities commensurate with the instantaneous slant range ($R_s$) being searched by the airborne radar and the altitude ($h$) of the aircraft in which it is mounted are available, no means are known whereby the squared quantities $R_s^2$ and $h^2$ may be derived therefrom with a high degree of accuracy while at the same time preserving the necessary band pass (response time) required for the sweep circuits of airborne radar. Moreover, means are not known which would give the square root of the quantity $\sqrt{R_s^2 - h^2}$ with the desired accuracy and time response needed in radar sweep circuits.

While the prior art has recognized the need for the solution of this critical scaling problem for accurate radar presentation in navigation and bombing systems, the means utilized for obtaining the desired hyperbolic relationship between the slant range voltage sweep, as an independent variable, and the ground range voltage sweep, as a dependent variable have been relatively inaccurate and, therefore, generally unsatisfactory. Accordingly, the teachings of the present invention provide more accurate means for deriving this critical hyperbolic relationship in a manner which may be used to derive a voltage commensurate with the base of any right triangle when voltages commensurate with the hypotenuse and altitude are known. It should be noted that the selection of which side of the right triangle is the base and which is the altitude is a matter of choice.

It is, therefore, a primary object of the present invention to provide new and improved means for electronically solving a right triangle.

It is another object of the present invention to provide new and improved means for accurately deriving a voltage commensurate with one side of a right triangle when the magnitude of the hypotenuse and the other side is known.

It is an additional object of the present invention to provide new and improved means for converting a saw-tooth waveform into an hyperbolic waveform.

It is still another object of the present invention to provide new and improved means for deriving an accurate voltage commensurate with ground range from known voltages commensurate with slant range and altitude.

It is another object of the present invention to provide new and improved means for providing a composite indication of successive ranges by an airborne radar with a map-like presentation where the correct ground distances between objects (targets and/or reference points) are maintained.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 3 is a detailed circuit diagram of the electrical embodiment set forth in FIG. 2.

Figure 1A:
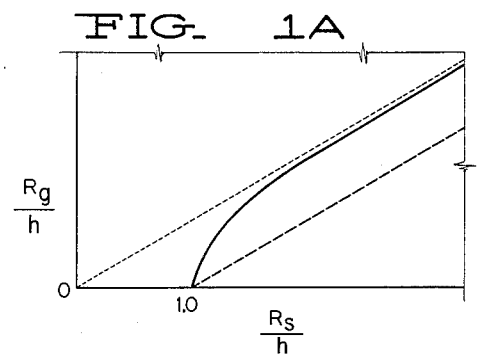
FIG. 1A is a graphic plot of ground range $R_g$ divided by altitude $h$ versus slant range $R_s$ divided by altitude $h$, which will be helpful in understanding the present invention.

As indicated above, one of the engineering applications to which the present invention may have particular utility is in the derivation of the hyperbolic relationship between the instantaneous slant range sweep voltage $R_s$ of an airborne radar system and the instantaneous ground range sweep voltage $R_g$ which may be used as an input to a radar indicator to provide a composite map-like presentation of a search sector. FIG. 1A shows a plot of the ground range sweep voltage $R_g$ divided by altitude $h$ versus the slant range sweep voltage $R_s$ divided by altitude $h$ as a solid line. As suggested by the discussion set forth above and an inspection of Equation 1, this relationship is hyperbolic in nature and asymptotically approaches a linear relationship represented by the dotted line with increasing $$\frac{R_s}{h}$$

ratios. Because it may be validly assumed that the altitude $h$ of the aircraft will not change significantly during the time period required for one range sweep of a radar indicator, the solid line plot is representative of the hyperbolic sweep required in order that the radar presentation be in terms of ground range rather than slant range. By way of review it should be apparent that the airborne radar has a minimum slant range for ground targets and ground navigational points equal to the altitude of the aircraft in which it is mounted and the projection of this minimum slant range on the ground (ground range) is always zero. Since this minimum slant range represents a limit with which the airborne radar system can provide a target and reference point presentation, it is never necessary to generate a slant range sweep voltage in airborne radar systems representing less than this minimum slant range. On the abscissa of FIG. 1A, this point is represented by a ratio $$\frac{R_s}{h}=1$$

For this reason, the prior art techniques referred to above have variably blanked out the initial portions of the slant range sweep voltage in accordance with the instantaneous altitude of the aircraft in which the radar is mounted in a manner effective to commerce the slant range sweep in a point in time commensurate with the time represented by the ratio $$\frac{R_s}{h}=1$$

in FIG. 1A. This delayed sweep is represented by the dashed line. When it became necessary to derive the instantaneous ground range voltage sweep from the instantaneous slant range voltage sweep, the saw-tooth voltage represented by the dashed line was modified by several R–C parameter combinations in a manner to combine the exponential charging curves of each, thereby altering the saw-tooth voltage waveform such as to approximate the hyperbolic function shown by the solid line. This is sometimes known as the approximation-by-synthesis technique. Not only is this hyperbolic function relatively inaccurate, but the network means utilized providing the derivation has to be modified in accordance with the various altitudes at which airborne radar would operate, thereby adding to the inaccuracies of this technique.

Figure 1B:
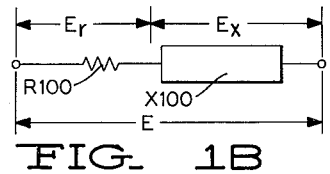
FIG. 1B is a representation for an electrical circuit showing an electrical analogy which is useful in understanding the present invention.
Figure 1C:
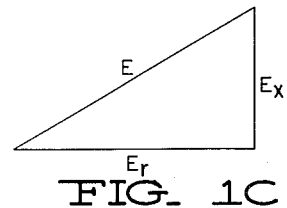
FIG. 1C is a vectorial representation of the voltage the circuit of FIG. 1B.

In order to avoid this inaccurate approach, the present invention provides a means for solving Equation 1 in a reasonably accurate manner and with a time response usable in the radar sweep circuits. A direction solution by known means of performing the mathematical operations required in the solution of the right hand side of Equation 1 is difficult because of the time response required. However, there is an analogy between the slant range-ground range-altitude triangle which Equation 1 represents and a series resistive-reactance network, which makes it possible to mechanize a solution. FIG. 1B represents such a network with a resistance R100 and a pure reactance X100 connected in series so that on the passage of current therethrough, a total voltage drop E takes place across the input and output terminals made up of a resistive voltage drop component $E_r$ (across R100) and a reactive voltage drop component $E_x$ (across X100). Because of the reactive nature of this series network, the relationship between these voltages is complex and must be represented by a vector diagram forming a right triangle as shown in FIG. 1C. Therein, we may assume angle as shown in FIG. 1C. Therein, we may assume that $E_x$ is analogous to the instantaneous altitude $h$; that $E_r$ is analogous to the instantaneous ground range sweep voltage; and that E is analogous to the slant range sweep voltage $R_s$.

According to the present invention, this analog similarity can be used to obtain an analog voltage E commensurate to the instantaneous slant range by adding a variable arbitrary voltage $E_r$, with a reference phase of zero degrees, to an analog altitude voltage $E_x$ with a reference phase of 90 degrees. Moreover, during this summing operation the instantaneous vectorial sum E is continuously compared with the instantaneous reference slant range sweep voltage $R_s$, and the magnitude of the arbitrary voltage $E_r$ is continuously modified in order to maintain the instantaneous values of voltages E and $R_s$ equal.

This continuous modification of the analog voltage $E_r$, in order that the vector sum E of $E_r$ and $E_x$ remains equal to the correct reference analog slant range voltage sweep $R_s$, will cause $E_r$ to vary hyperbolically with respect to the voltage vector E which in turn follows the instantaneous reference slant range sweep voltage $R_s$. This reference analog slant range sweep voltage $R_s$ may be the conventional saw-tooth slant range search voltage of an airborne radar system and may be represented by the dotted line shown in FIG. 1A instead of the variably blanked out saw-tooth waveform represented by the dashed line. Based on the valid assumption that the altitude of the aircraft carrying the airborne radar remains constant during the time required for a complete sweep of the slant range sweep voltage $R_s$, the variable voltage $E_r$ will be equal to the ground range voltage sweep $R_g$ and vary as a hyperbolic function of the slant range voltage sweep $R_s$. It is important that the continuous comparison of E and $R_s$ and the modification of $E_r$ be as instantaneous as possible when compared with the time required for one slant range sweep. The better the time response, the more perfectly the hyperbolic relationship between $R_g$ and $R_s$ is reproduced. It should be noted that when using the teachings of the present invention that it is not necessary to variably blank out the slant range voltage sweep until the ratio $$\frac{R_s}{h} = 1.0$$

(shown in FIG. 1A) is reached, inasmuch as the invention utilizes a comparatively direct solution of Equation 1 represented by the dotted straight line and the hyperbolic solid line of FIG. 1A.

Figure 2:
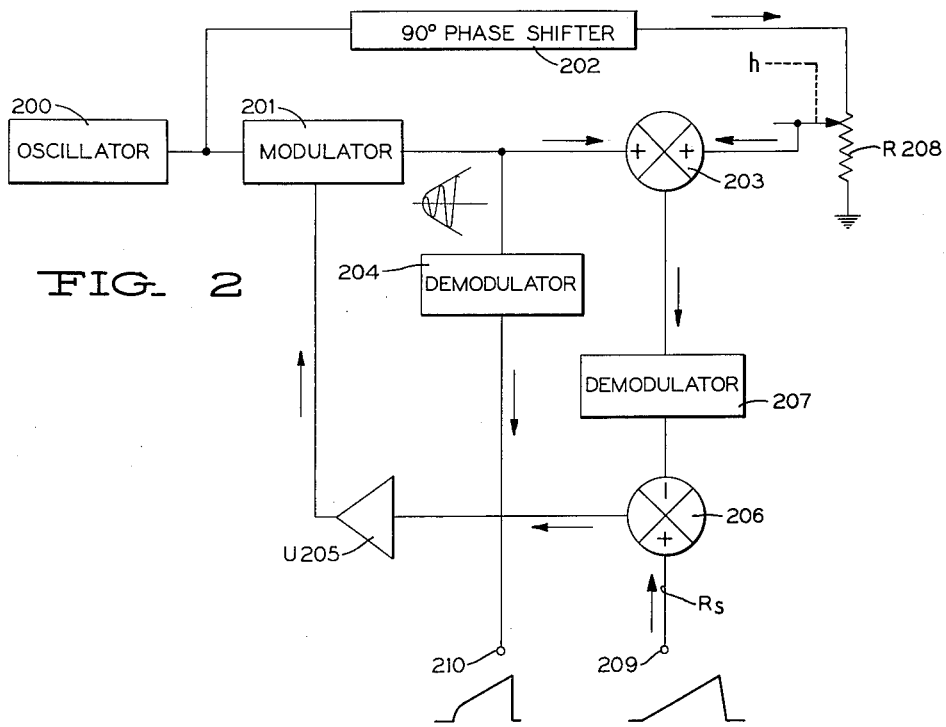
FIG. 2 is an exemplary block diagram showing an electrical embodiment according to the present invention.

FIG. 2 shows an embodiment of the present invention in block diagram form. Therein an oscillator 200 generates a high frequency signal which may be split into two signal components displaced in phase by 90 degrees at the carrier frequency. The selection of the carrier frequency at which oscillator 200 operates is determined by the sampling rate desired. As a matter of practice, the frequency may lie in the 1–10 megacycle range. Any specific type of oscillator which would operate at a comparatively constant frequency in this range may be utilized to practice the present invention. One component output from oscillator 200 may be fed directly to a modulator 201 providing a variable means for deriving the above-described voltage commensurate with $E_r$. The other signal output component from oscillator 200 may be phase shifted by 90 degrees using any of the well known techniques such as a co-axial delay line shown herein by block 202. In order that a voltage be derived which is commensurate with $E_x$ and phase shifted from $E_r$ by 90 degrees, the output from phase shifting means 202 may be used to energize one terminal of a potentiometer R208, the wiper thereof being positioned in accordance with the instantaneous altitude $h$ of the airborne radar. Thus, a voltage is developed on the wiper of R208 which is commensurate with the voltage $E_x$ which is analogous to the instantaneous altitude $h$.

Modulator 201 may be one of several known modulating devices capable of providing a signal envelope at the carrier frequency which is commensurate with the magnitude of a modulating D.C. voltage input of one polarity. In addition, the modulator must be such that it may be held at cut-off by a modulating D.C. voltage input of the opposite polarity. Further, it is desirable that the modulator be of a type such that the relationship between the modulating D.C. voltage and the magnitude of the envelope of the carrier signal output be linear. The advantages occurring from a linear relationship will be set forth in connection with FIG. 3.

Referring again to FIG. 2, the output of modulator 201 is a modulated carrier output signal commensurate with the variable resistive voltage hereinbefore described in connection with FIG. 1C as $E_r$ and the output voltage from the wiper of potentiometer R208 which is commensurate with the reactive voltage referred to above as $E_x$. According to the invention as described above, these two voltages are combined by adder 203. Adder 203 may be of the bridge type or any of the other well known electronic devices which consider the phase relationship of each of the voltage components combined. Since the quadrature relationship between the voltages $E_r$ and $E_x$ is maintained in the combining means, the output from adder 203 is an A.C. voltage whose magnitude and phase is commensurate with the summation voltage heretofore referred to as E. In that it is only the magnitude of this voltage E with which the technique of the present invention is concerned, the envelope of voltage E may be detected by a demodulator shown as block 207. The demodulator may also include a conventional filter circuit. The output voltage from the demodulator 207 may then be compared with a voltage commensurate with the instantaneous analog slant range sweep voltage $R_s$ which may be accurately provided by a highly linear saw-tooth source applied to terminal 209. Accurate saw-tooth generators are well known in the arts and may be exemplified by the well known boot-strap type which will be referred to below. The output from demodulator 207 and the reference input at terminal 209, both being D.C., may be combined differentially by any of the well known algebraic summing techniques represented by differential 206. Any instantaneous difference existing between these two quantities E and $R_s$ is detected and a D.C. voltage commensurate therewith is supplied to a D.C. summing amplifier U205. It should be noted that an alternative exists with regard to the polarity of reference quantity $R_s$. For example, $R_s$ may have the same polarity as the simulated quantity E with the differential comparing device being of a type which subtracts these quantities, or conversely, where $R_s$ and E are of different polarities the differential comparing device may be of a type which takes the algebraic sum of these quantities. FIG. 2 illustrates the former in block diagram form, while FIG. 3 illustrates the latter alternative in a more specific manner which will be described below.

The output from U205, which is inverted with respect to the input, is utilized as the D.C. voltage input to the modulator 201, thereby altering the magnitude of its variable output voltage $E_r$ which is in turn fed to adder 203 such that the demodulated voltage commensurate with E is maintained equal to the instantaneous value of the accurate analog sweep voltage $R_s$. The selection of the D.C. amplifier U205 and the modulator 201 must be, as suggested above, based on sufficiency of the correcting loop in regard to time response and band pass considerations, such as to allow the feedback correcting circuit to instantaneously maintain the variable $E_r$ voltage such that no error voltage is generated by differential 206. Based upon the substantially instantaneous modification of the voltage commensurate with E to be equal to the slant range sweep voltage $R_s$, the modulation of the signal envelope output from modulator 201 will then represent a solution of the simulated right triangle represented by FIG. 1C for $E_r$ and the instantaneous ground range voltage sweep $R_g$. Based on the mathematical relationship between voltage E and voltage $E_r$, the envelope of the output from modulator 201 will be hyperbolic and may be converted to a hyperbolic sweep voltage by demodulator 204 and applied to output terminal 210. Demodulator 204 may contain a conventional filter portion as required. The output from terminal 210 representing the hyperbolic ground range sweep voltage $R_g$ may be applied to the sweep circuits of airborne radar systems to provide the map-like presentations usable in bombing and navigational radar systems. Except for the initial rate of rise of the hyperbolic waveform, the generation of which is determined by the high frequency capabilities of the modulator and the usual circuit band pass considerations, the waveform of ground range sweep voltage $R_g$ will be accurately and continuously reproduced without regard to changes in the altitude of the airborne radar.

While an altitude potentiometer is disclosed for modulating the reactive component of the carrier signal to provide a voltage commensurate with $E_x$, a different approach might have been adopted which utilizes a carrier modulation means where the control grid is energized by a D.C. voltage commensurate with the instantaneous altitude of the aircraft in which the airborne radar is mounted.

Referring to FIG. 3, electronic circuit elements are shown therein which perform the functions shown in simplified block diagram form in FIG. 2. FIG. 3 may be regarded as exemplary of a specific embodiment in which the teachings of the present invention may be practiced by one skilled in the art. Oscillator 200 is shown in FIG. 3 as a crystal controlled oscillator circuit comprising a five element tube V310 having a plate 305, suppressor grid 306, screen grid 307, control grid 308 and cathode 309 connected to provide for oscillation in the output transformer winding 316 at the desired carrier frequency in a conventional manner. Specifically, cathode 309 is connected to ground through an RF choke 304 and also to the junction point of one terminal of each of the feedback capacitors C302 and C303 and grid resistance R301. The other terminals of resistance R301 and capacitor C302 are connected to control grid 308 while the other terminal of capacitor C303 is connected to ground. Crystal 300 is connected between the control grid 308 and ground. The regenerative feedback necessary to sustain the desired oscillation is provided by the interelectrode capacitance between screen grid 307 and control grid 308. This feedback provides the necessary energy to sustain the oscillation of crystal 300 at its natural frequency (the desired carrier frequency). Screen grid 307 is connected directly to the D.C. supply voltage. Suppressor grid 306 is maintained at a slightly positive potential by the D.C. supply voltage through suppressor grid biasing resistor R313 in order that it perform the function of suppressing secondary emission from plate 305. Suppressor grid 306 is also connected directly to ground through RF bypass capacitor C311 and suppressor grid bias resistor 312 connected in parallel. Capacitor C341, as connected in FIG. 3, also serves as the RF bypass. Plate 305 is connected to the D.C. power supply through the primary winding 316 which is tuned to resonance by parallel plate tuning capacitor C314 and parallel padding condenser C315.

The carrier frequency output of the oscillator appears in primary winding 316 which has two output windings 317 and 318 for providing the two carrier frequency output components referred to above in connection with FIG. 2. Center tapped output winding 317 provides the variable resistive carrier frequency component which is fed to the modulator generally identified as block 201 in FIG. 2 and specifically shown as a beam deflecting pentode V350 in FIG. 3. Output winding 318 provides the other carrier frequency component to the 90 degree phase shifting means exemplified by a quarter wave length delay line 319. It is emphasized that any one of the numerous methods for obtaining a phase shift in the frequency range which the present inventive technique may operate could well be substituted for the means shown. As shown in FIG. 2, the output from the phase shifting means 319 is used in FIG. 3 to energize a potentiometer, the wiper of which is positioned in accordance with the instantaneous altitude of the aircraft carrying the airborne radar. The voltage appearing on the wiper of potentiometer 320 is equal to the analog of the aircraft elevation $E_x$. The selection by design of the magnitudes of the peak to peak voltage to be induced in output windings 317 and 318 is determined by the desired scaling of the particular sweep circuit voltages to be used by the radar utilizing the teachings of the present invention.

Modulator 201 is shown in FIG. 3 as a beam deflecting pentode V350 of a type manufactured by the General Electric Company and identified as a 6AR8. The tube V350 comprises two plates 351 and 352, two beam deflectors 353 and 354, a dual suppressor grid 355, a dual screen grid 356, a dual control grid 357, and a dual cathode 358. Cathode 358 is connected to ground through cathode biasing resistor R359 and bypass capacitor 360. Dual control grid 357 is connected to receive a D.C. modulating voltage in accordance with an error voltage to be derived as set forth below. The carrier frequency voltages appearing at the extremities of output winding 317 are applied to beam deflectors 353 and 354, respectively. Plates 351 and 352 are each connected to equal resistances R326 and R327, respectively, while the other terminal of each is tied to a common terminal which has the D.C. supply voltage applied thereon through load resistance R332. Also placed between this common terminal is RF bypass capacitor C333. Coupling capacitors C324 and C325 are connected to each of the plates 351 and 352, respectively. The other terminal of each one of these capacitors are connected together through a plate tank coil 340.

The RF carrier voltage applied to the beam deflectors 351 and 352 acts to sweep the electron beam from dual cathode 358 alternately to plates 351 and 352 at the carrier frequency, while the magnitude of the carrier voltage appearing on the plates is determined by the D.C. voltage appearing on dual control grid 357. The peak to peak voltage carrier output commensurate with $E_r$, as described above, appears across resistances R326 and R327 and is applied through coupling capacitors C324 and C325 to terminals 1 and 2 of an adder bridge. Likewise, the modulated carrier frequency voltage output commensurate with $E_x$ between the wiper of R320 and ground is applied to the adder bridge terminals 3 and 4, as shown. For combining these voltages an A.C. balanceable bridge is disclosed comprising a variable capacitance C320 between terminals 1 and 3, variable capacitance C321 between terminals 3 and 2, and variable capacitance C323 between terminals 1 and 4, while the capacitance between terminals 2 and 4 is provided by the grid to cathode interelectrode capacitance of a detector V325 connected in a manner which will be described below. The entire balanced bridge adding network shunts the plate coil 340 and serves as part of a resonant circuit. The bridge capacities may be calculated so that the total capacity shunting the plate coil 340 is slightly less than that required to resonate the plate tank circuit, and a further variable capacitance C322 may be inserted as shown across the bridge to provide a means for fine tuning to resonance. Because of the nature of an A.C. balanced bridge, the adjustment of variable capacitance C322 to resonate the plate tank circuit does not unbalance the bridge. The equal resistances R326 and R327, referred to above, serve to lower the Q of this resonant plate circuit to the desired band width besides providing a D.C. return for the plates 351 and 352.

The modulating operation of the modulating circuit provided by the use of the particular beam deflecting pentode identified as the 6AR8 has an additional advantage in that the relationship between the magnitude of the carrier frequency envelope appearing at its output is linear with respect to the magnitude of the error modulating voltage appearing on control grid 357. Because of the closed-loop modulation provided by the inventive system described above, it is not necessary that this relationship be a linear one. However, because of this additional feature, the generated hyperbolic sweep voltage output commensurate with $R_g$ may be taken directly from the junction of resistors R326 and R327 without requiring a detector stage as shown in FIG. 2.

The output voltage from the balanced bridge adding network for summing the voltages commensurate with $E_r$ and $E_x$ at the carrier frequency in quadrature is a modulated carrier envelope where the magnitude and phase of the modulation is commensurate to their vector sum E. Since it is the instantaneous magnitude of the voltage E with which the present invention is concerned, the output from the bridge is fed into a detector stage which may comprise any of the well known infinite impedance detectors such as the cathode follower detector circuit shown. As shown herein, this cathode follower circuit comprises a triode V325 consisting of a plate 326, a control grid 327 and cathode 328 in combination with a cathode resistor R329. Plate 326 and the other terminal of cathode resistor 329 may be energized by opposite polarity voltages from the D.C. voltages from the equipment power supply. The output voltage commensurate with the instantaneous magnitude of the envelope of E is taken from across the cathode R329 in a conventional manner and differentially compared with the output from an accurate linear saw-tooth generator 335 deriving an accurate voltage commensurate with the slant range sweep voltage $R_s$ utilized by the particular airborne radar equipment. As shown, this differential comparison circuit may comprise an algebraic summing resistance network comprising variable resistor R331 and resistor R330.

The accurate linear saw-tooth generator may comprise any of a number of the well known types of saw-tooth generators exemplified by the type popularly known as the boot-strap and described in detail in FIG. 7.15 and discussed on pages 267–278 of the Radiation Laboratory Series Volume 19 entitled "Waveforms" by Chance et al. Any difference in magnitude between the voltage commensurate with E derived from the output of the cathode follower detector circuit, and the sweep voltage commensurate with $R_s$ which is applied to input terminal 209 is fed from the differential comparing network to the input of a D.C. amplifier U334 to be applied to the modulator control grid 357 in order that the magnitude of the output from the modulator stage $E_r$ be instantaneously modified such that the voltage E is maintained equal to $R_s$. Since the vector sum of quadrature voltages $E_r$ and $E_x$ are attenuated approximately 50 percent in the balanced bridge and the gain of the cathode detector stage is less than unity, the differential comparing network must be adjusted to a proper mixing ratio, which is approximately 2 to 1, to take this in account. Variable summing resistor R331 provides for such an adjustment. The D.C. summing amplifier U334 like the D.C. summing amplifier U205 of FIG. 2 should have a sufficient time response or band pass characteristic such that the modulator circuit may reproduce the hyperbolic waveform or the carrier frequency envelope.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A hyperbolic waveform generating means for deriving a voltage commensurate with the ground range sweep voltage input to an airborne radar presentation comprising electronic means for simulating the slant range-ground range-altitude triangle of said airborne radar comprising means for deriving a first voltage commensurate with simulated ground range, means for deriving a second voltage commensurate with the actual altitude of said airborne radar which is phase shifted from said first voltage by 90 degrees, electronic means for vectorially summing said first and second voltages for deriving a third voltage, a linear saw-tooth voltage source commensurate with the slant range sweep voltage input to an airborne radar presentation, differential means for comparing the instantaneous magnitudes of said third voltage and said linear saw-tooth voltage, means for modifying the magnitude of said first voltage in accordance with the output of said differential means until the waveform of said third voltage corresponds to said linear saw-tooth voltage such that said first voltage has a hyperbolic waveform and is commensurate with the desired ground range sweep voltage input to an airborne radar presentation.

2. A hyperbolic voltage waveform generating means comprising electronic means for simulating a right triangle comprising means for deriving a first voltage commensurate with the magnitude of the simulated base of said simulated right triangle, means for deriving a second voltage commensurate with the magnitude of the simulated altitude of said simulated right triangle which is phase shifted from said first voltage by 90 degrees, electronic means for vectorially summing said first and second voltages for deriving a third voltage whose waveform is commensurate with the magnitude of the simulated hypotenuse of said simulated right triangle, a linear saw-tooth voltage source providing a reference right triangle, differential means for comparing the instantaneous magnitudes of said third voltage and said linear saw-tooth voltage, means for modifying the magnitude of said first voltage in accordance with the output of said differential means such that the waveform of said third voltage maintains a correspondence to said linear saw-tooth voltage and said first voltage has a hyperbolic waveform.

3. A hyperbolic voltage waveform generating means comprising means for deriving a first direct current voltage commensurate with the magnitude of the simulated hypotenuse of a simulated right triangle including means for deriving a second voltage commensurate with the magnitude of one side of said simulated right triangle and means for deriving a third voltage commensurate with the magnitude of the other side of said simulated right triangle, a linear saw-tooth voltage source commensurate with the magnitude of a reference right triangle, direct current differential means for comparing the instantaneous magnitudes of said first voltage and said linear saw-tooth voltage, direct current means for modifying the magnitude of said second voltage in accordance with the output of said differential means such that the waveform of said first voltage maintains a correspondence to said linear saw-tooth voltage and said second voltage has a substantially accurate hyperbolic waveform.

4. A hyperbolic waveform generating means for deriving a voltage commensurate with the actual ground range sweep input to an airborne radar presentation comprising means for deriving a first direct current voltage commensurate with simulated slant range voltage waveform including a means for deriving a second voltage commensurate with the magnitude of corresponding simulated ground range and means for deriving a third voltage commensurate with the magnitude of the altitude of said airborne radar, a linear saw-tooth voltage source commensurate with the actual slant range sweep voltage input to an airborne radar presentation, direct current differential means for comparing the instantaneous magnitudes of said first voltage and said linear saw-tooth voltage, means for modifying the magnitude of said second voltage in accordance with output of said differential means such that the waveform of said first voltage maintains a correspondence to said linear saw-tooth voltage such that said second voltage has a hyperbolic waveform and is commensurate with the desired actual ground range sweep voltage to an airborne radar presentation.

5. A hyperbolic waveform generating means for deriving a voltage commensurate with the ground range sweep voltage input to an airborne radar presentation comprising electronic means for simulating the slant range-ground range-altitude triangle of said airborne radar comprising means for deriving a first voltage commensurate with simulated ground range, means for deriving a second voltage commensurate with the actual altitude of said airborne radar which is phase shifted from said first voltage by 90 degrees, electronic means for vectorially summing said first and second voltages for deriving a third voltage, a linear saw-tooth voltage source commensurate with the slant range sweep voltage input to an airborne radar presentation, differential means for comparing the instantaneous magnitudes of said third voltage and said linear saw-tooth voltage, means for modifying the magnitude of said first voltage in accordance with the output of said differential means such that the instantaneous magnitude of said third voltage is made to correspond to the instantaneous magnitude of said linear saw-tooth voltage such that said first voltage has a hyperbolic waveform and is commensurate with the desired ground range sweep voltage input to an airborne radar presentation.

6. A means for deriving a voltage commensurate with the base of a right triangle comprising electronic means for simulating a right triangle comprising means for deriving a first voltage commensurate with the magnitude of the simulated base of said right triangle, means for deriving a second voltage commensurate with the magnitude of the simulated altitude of said simulated right triangle which is phase shifted from said first voltage by 90 degrees, electronic means for vectorially summing said first and second voltages for deriving a third voltage whose instantaneous magnitude is commensurate with the instantaneous magnitude of the simulated hypotenuse of said right triangle, a linear saw-tooth voltage source providing a reference right triangle, differential means for comparing the instantaneous magnitudes of said third voltage and said linear saw-tooth voltage, means for modifying the magnitude of said first voltage in accordance with the output of said differential means such that the instantaneous magnitude of said third voltage corresponds to the instantaneous magnitude of said linear sawtooth voltage and said first voltage is commensurate with the instantaneous magnitude of the base of the reference right triangle.

7. A hyperbolic waveform generating means comprising electronic means for simulating a right triangle comprising alternating current carrier modulating means for deriving a first voltage commensurate with the magnitude of the simulated base of said simulated right triangle, alternating current carrier modulating means for deriving a second voltage commensurate with the magnitude of the simulated altitude of said simulated right triangle which is phase shifted from said first voltage by 90 degrees, electronic means for vectorially summing said first and second voltages for deriving a third voltage whose alternating current carrier is modulated commensurate with the magnitude of the simulated hypotenuse of said simulated right triangle, demodulating means response to said third voltage for deriving a direct current voltage commensurate with the instantaneous magnitude of said third voltage, a linear sawtooth voltage source providing a reference right triangle, direct current differential means for comparing the instantaneous magnitudes of the output of the said demodulator and said linear sawtooth voltage, direct current means for modifying the magnitude of modulation of said first voltage in accordance with the output of said differential means such that the waveform of said demodulator maintains a correspondence to said linear saw-tooth voltage and said first voltage has a hyperbolic carrier envelope.

8. The hyperbolic voltage waveform generating means set forth in claim 7 wherein said demodulator means comprises a cathode follower detector.

References Cited in the file of this patent
UNITED STATES PATENTS

| | | |
|---|---|---|
| 2,536,495 | Ewing | Jan. 2, 1951 |
| 2,773,641 | Baum | Dec. 11, 1956 |
| 2,809,326 | Gulnac et al. | Oct. 8, 1957 |